United States Patent
Valle et al.

[11] Patent Number: 6,055,818
[45] Date of Patent: *May 2, 2000

[54] METHOD FOR CONTROLLING REFRIGERANT BASED AIR CONDITIONER LEAVING AIR TEMPERATURE

[75] Inventors: Phil J. Valle, Germantown; Peter E Groenewald, Wauwatosa, both of Wis.

[73] Assignee: Desert Aire Corp., Milwaukee, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,380

[22] Filed: Aug. 5, 1997

[51] Int. Cl.$^7$ .............................. F25B 29/00; F25B 49/00
[52] U.S. Cl. ............................ 62/173; 62/176.5; 62/196.4
[58] Field of Search .......................... 62/90, 196.4, 173, 62/176.5

[56] References Cited

U.S. PATENT DOCUMENTS

| | | | |
|---|---|---|---|
| 1,837,798 | 12/1931 | Shipley | 62/90 X |
| 3,402,564 | 9/1968 | Wussbaum | 62/173 |
| 3,603,504 | 9/1971 | Stang, Jr. | 236/84 |
| 3,738,117 | 6/1973 | Engel | 62/90 X |
| 3,926,008 | 12/1975 | Webber | 62/238.6 |

OTHER PUBLICATIONS

Process Instruments and Controls Handbook, Considine 1957, pp. 11–17, 11–21, 11–22 TA 165.C65.

Catalog of "Staefa Control System, Inc."; Buffalo Grove, IL, 5 pages, Section S1–06.15 showing Model M3FB.LX Modulating Diverting Valve.

*Primary Examiner*—William Wayner
*Attorney, Agent, or Firm*—Ryan Kromholz & Manion, S.C.

[57] ABSTRACT

Precise control of the temperatures of leaving air in an air conditioning system and of leaving water in a water heating system are obtained with a throttling valve whose flow rate is modulated with an electric signal. The high pressure outlet of a refrigerant compressor is coupled jointly to the inlet of the valve and to the refrigerant inlet of a first condenser and the outlet of the valve is coupled jointly to the refrigerant outlet of the first condenser and to the refrigerant inlet of a second condenser. A programmable controller receives input signals corresponding to one or more entering media characteristics, such as dry bulb temperature, dew point temperature, and percent humidity and produces control signals that modulate the valve flow rate to thereby maintain the leaving air or water temperature at a specified set point with high precision.

4 Claims, 4 Drawing Sheets

PRE-EXISTING

METHOD FOR CONTROLLING REFRIGERANT BASED AIR CONDITIONER LEAVING AIR TEMPERATURE

BACKGROUND OF THE INVENTION

The invention disclosed herein pertains in general to air conditioning systems and in particular to maintaining precise control over the temperature of air that is leaving a system or the temperature of water that is leaving a system if the basic concepts of the invention are utilized in a water or other liquid heating system.

The new refrigerant modulated precision control over the leaving medium temperature will be demonstrated herein as applied in a system that is dedicated to supplying fresh outdoor air directly to one or more rooms in a building or, alternatively, by using the ducts of a conventional air conditioning system. Those who are knowledgeable in designing heating, ventilating and air-conditioning systems will readily perceive that the new method of control will have a variety of applications.

It is known that occupants of some buildings acquire respiratory illnesses and other illnesses that are related to poor air quality. These illnesses can and do occur even in buildings that are equipped with conventional air conditioning systems of acceptable design. In cases where the dew point of the treated air is relatively high, conditions will exist in the air distribution ducts that encourage growth of fungi, molds and bacteria which become entrained in the air stream and are inhaled by the occupants of the building.

Air that is supplied to a room or building by way of conventional air conditioning systems often does not have enough dry or dehumidified outdoor air added for maintaining optimum health conditions. Most conventional air conditioning systems take in some outdoor air and mix it in the return air stream, cool and dehumidify it and/or heat it and discharge it into a distribution duct system. However, as skilled conventional system designers know, there are technical limitations and adverse economical considerations that prevent designing for mixing not much more than 15% to 20% of fresh outside air into the conditioned air stream. The permissible amount of outside air is usually governed by expected temperature and humidity extremes in the climate at which the system is installed. Usually, if a large percentage of outside air must be added to air that is circulated in a conventional air conditioning system, the capacity of the system must be increased. This means that the system will be more expensive because of larger condensers, evaporators, compressors, compressor motors and housings will be required.

Because the importance of adequate outside air to the health of occupants has been recognized, building codes are amended to compel adding specified large quantities of outside air to spaces that are occupied by people wherever possible such as in new construction and refurbished buildings. Thus, it becomes important to assure that the temperature of the air leaving the conditioning unit be held at a precise temperature that is comfortable to occupants of a room onto whom the leaving air stream may impinge directly.

A widely used system that is dedicated to admitting outside air to a room or to mix in the ducts of a conventional air conditioner system is a system that is based on controlling separate dampers to define combined and/or alternate air paths for regulating leaving air temperature. The principles of the heretofore most widely used system will be described in detail later. As will be evident, a major problem with this system is that precise control over the leaving air temperature cannot be achieved because dampers can only make gross changes in air flow patterns within a unit but the method cannot control with adequate precision to prevent the temperature from hunting above and below the thermostat set point. Moreover, the system that has been used most extensively up to the time of the present invention is a system that is unduly costly to make, requires a large space in a building and has less than optimized serviceability.

SUMMARY OF THE INVENTION

An objective of the invention is to provide a method and device for controlling leaving air temperature with high precision.

According to the invention, instead of attempting to control leaving air temperature by manipulating dampers in an air stream, control is obtained by proportioning the flow of hot refrigerant gas between a reheat or first condenser in the housing of the unit and a separate second condenser isolated from the main air stream. The second condenser is positioned outside of the building or at any other place where it may be desirable to use the heat that it dissipates. The first or second condenser can also be used to heat water to a precisely controlled temperature, for example, using the new control system.

As in conventional air conditioning units, the refrigeration system utilized in conjunction with an illustrative embodiment of the invention includes a refrigerant compressor having an outlet for the pressurized hot gas developed therein. Entering air is drawn up over a refrigerant evaporator and a first condenser in the stated order. In accordance with the invention, however, the inlet of an electroresponsive gaseous refrigerant flow-throttling valve is connected jointly to the high pressure outlet of the compressor and to the inlet of a first condenser. The outlet of the throttling valve is connected jointly to the outlet of the first condenser and to the inlet of a second excess-heat dissipating condenser which is out of the main airstream. The outlet of the second condenser connects by way of suitable piping and intervening devices to the inlet of an expansion valve that is connected to the evaporator. The first condenser is also designated as a reheat condenser. Outside air that has been cooled and dehumidified by flowing over the evaporator when the evaporator is activated or has flowed over the evaporator when it is not active must also flow over the coil of the reheat or first condenser.

In a preferred embodiment, the system is controlled with a microprocessor-based programmable controller. This controller uses signals representative of entering outside air characteristics such as dry bulb temperature and humidity, preferably, or of dry bulb temperature only and leaving air temperature signals to control the setting of the refrigerant flow throttling valve in an infinite number of increments for maintaining the leaving air temperature correspondingly precise.

The controller determines a control signal that is used to control the hot pressurized refrigerant gas flow by adjusting the throttling valve which has full responsibility for maintaining the leaving air temperature precisely. The refrigeration compressor turns on only when the outside air requires cooling and/or dehumidification. In the illustrative embodiment of the invention, described in detail herein, the entering air dry bulb temperature and percent humidity are the characteristics that are provided to the controller, which, of course, makes it possible for the controller to calculate the dew point with the proper software.

The system continuously measures the leaving air temperature and responds in any of three ways. If the leaving air temperature corresponds to the thermostat set point, the throttling valve opening remains constant. If the leaving air temperature is below the set point, the throttling valve is caused to close and further increase refrigerant pressure drop in the hot gas line which diverts more refrigerant to the reheat first condenser in the inside of the unit. This effectively increases reheating of air that has passed through the evaporator. If the leaving air temperature is above set point, the controller opens the throttling valve so as to further decrease the pressure drop in the hot gas line which causes more refrigerant to bypass the unit internal reheat condenser to effectively reduce reheating and thereby cause leaving air temperature to fall back to set point temperature from which it has departed by only an infinite decimal part of a degree above set point. Thus, the system has practically no hysteresis.

How the foregoing objectives and features of the invention are achieved and implemented, will appear in a more detailed description of a preferred embodiment of the invention which will now be set forth in reference to the accompanying drawings.

DESCRIPTION OF THE DRAWINGS

FIG. 6 is a diagram for illustrating how the new control system is used for precisely controlling leaving water temperature in a water heating system.

DESCRIPTION OF A PREFERRED EMBODIMENT

Figure 1:
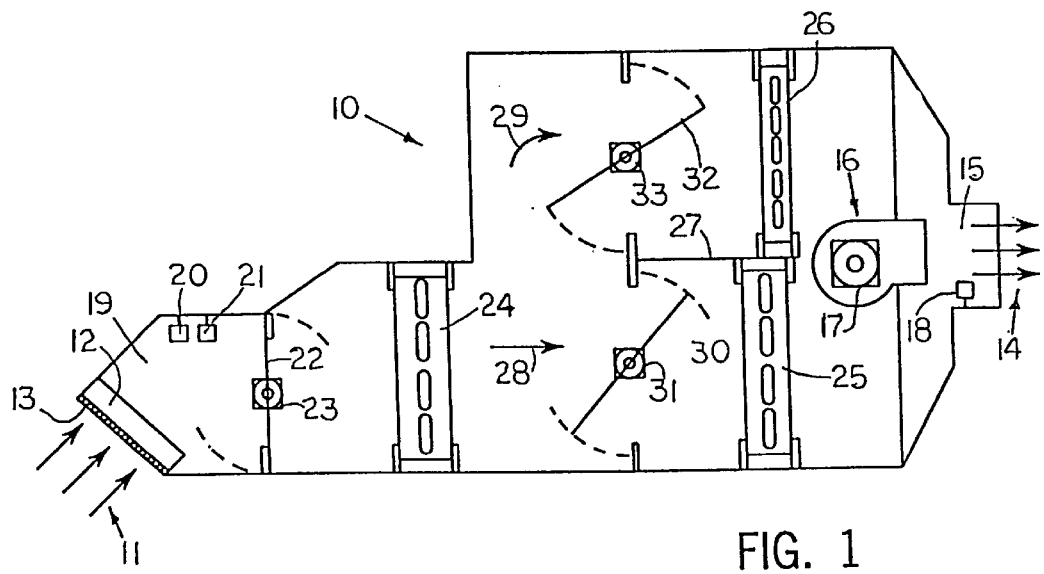
FIG. 1 is a diagrammatic view of the heretofore widely used unit that is dedicated to admitting only outside air into a building.

FIG. 1 is a diagram of a previously mentioned pre-existing outdoor air admitting unit that has been widely used before the present invention was made. It depends for controlling leaving air temperature on manipulation of dampers in parallel air stream paths. The unit comprises a housing that is designated generally by the numeral 10. The flow direction of outside air entering the unit housing 10 is indicated by a group of arrows marked 11. Entering air must pass through an air filtering device 12 that is protected by a screen 13. The flow direction of the air leaving the unit and being discharged into a building or room is indicated by the group of arrows marked 14 in the right region of the drawing. Air leaves the housing of the unit through the duct 15 which may discharge air directly into a room or into the duct system, not shown, of a conventional air conditioning system, not shown, that is installed in a building. Air is drawn through the housing 10 by means of a blower 16 driven by a blower motor 17. The leaving air outlet 15 has a temperature sensing device 18 positioned in it although this sensor can be positioned elsewhere as long as it can yield a signal that is representative of the leaving air temperature.

The air entry plenum 19 is shown as having an entering air humidity sensor 20 and an entering air dry bulb temperature sensor 21 preferably, although the results can be achieved if only dry bulb temperature is sensed if the controller is suitably programmed. As shown, a damper 22 is presently driven to a closed position by way of a motor 23. The damper may be closed at nighttime or when there are no occupants in the building. Damper 22 is closed when ventilation air is not necessary or if a power outage exists. Most of the components of the refrigeration system necessarily being present in the unit are not shown with the exception of a refrigerant evaporator 24 and a reheat condenser 25. An auxiliary heater 26 is shown in one of the air paths. This heater may be a type that depends on electricity, hot water, steam or a gas flame to provide supplementary heat if the unit is installed in a climate where temperatures are likely to become so low that auxiliary heating is required. Otherwise, reheat condenser 25 may provide sufficient heat for keeping the leaving air temperature near the required level.

A partition wall 27 divides the housing into a first air path 28 and a second air path 29. The quantity of air flowing in air path 28 is governed by the position of a damper driven by a motor 31. Flow through the second or bypass air path 29 is governed by the position of a damper 32 driven by a motor 33. The dampers 30 and 32 are operated inversely in an attempt to hold the total leaving air cubic feet per minute (cfm) constant.

When the unit is operating, that is, when entry air damper 22 is open and blower 16 is operating, all air drawn through housing 10 must pass through cooling and dehumidifying evaporator 24 whether or not the evaporator is active or doing anything but leaving air pass through it.

Suppose for an example of how the FIG. 1 pre-existing system works, that the leaving air temperature is selected to be maintained at as close as possible to 78° F. Assume further that the outdoor air is at 95° F. and far above an acceptable dew point or percent humidity value. The control system for the refrigeration system, neither of which are shown, would dictate that evaporator 24 should be activated to cool and dehumidify the entering air. Assume further that with a leaving air temperature of 78° F., that the entering air passing through evaporator 24 would have to be cooled far below 78° F. in order to extract the required amount of humidity from the air stream. In such case, the system would have to depend upon reheat condenser 25 to raise the temperature of the cooled and dehumidified air to the set comfort level of 78° F. But refrigeration systems do not respond to control influences instantaneously so that, if at the moment the leaving temperature is above or below what it should be, the effort is made with the prior system of FIG. 1 to regulate damper 30 and bypass damper 32 so that the mixture of air flowing in the reheat condenser 25 path 28 under control of damper 30 and the bypass path 29, under the control of damper 32, results in a mixture of air at near the desired temperature for being presented to the inlet of the blower 16. Experience has shown that a system such as that depicted in FIG. 1 has an undesirably long time of response to a variation in the leaving temperature. Moreover, the prior system has the disadvantage of requiring two air streams under control of separate dampers which means that the housing 10 of the unit must be larger than is desirable and that the cost of additional dampers and damper motors must be incurred.

The FIG. 1 system requires a large amount of space for installation because of the added size needed to provide a housing with two separated air paths 28 and 29.

Figure 2:
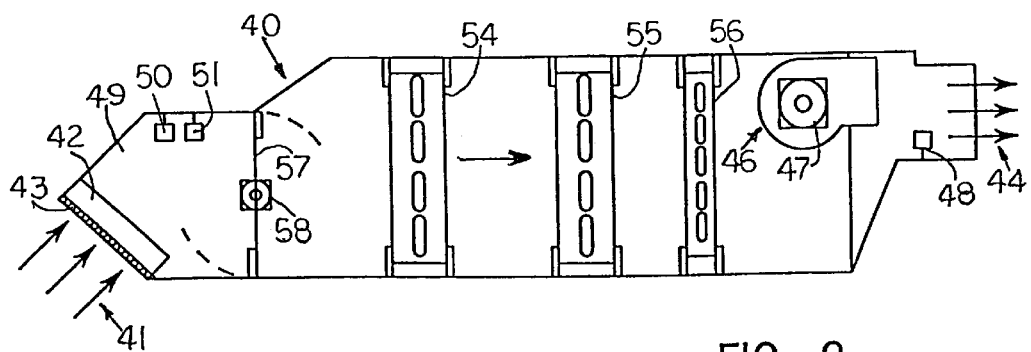
FIG. 2 is a diagrammatic view of a unit that is dedicated to admitting only outside air into a building and provides a site for demonstrating the new leaving air temperature control system.

FIG. 2 is a diagram of a unit that is dedicated to admitting outside air to a building or room wherein the new device and method of controlling the leaving air temperature, in accordance with the invention, is utilized. In FIG. 2, the housing for the conditioning unit is identified generally by the numeral 40. The group of arrows 41 indicates the entering air flow direction and, as in the unit described in the preceding FIGURE, the entering air passes through a filter 42 that is preceded by a protective screen 43. The leaving air flow direction is it icated by the group of arrows marked 44. A blower which drows air through the housing 40 of the unit is marked 46 and its motor is marked 47. There is a leaving air temperature sensor 48 positioned in an appropriate location for sensing the temperature of the leaving air. In the air entry plenum 49, an entry air temperature sensor 50 and a humidity sensor 51 are positioned. The humidity and temperature data from entering air temperature and humidity sensors 50 and 51 and leaving air temperature sensor 48 are sent to a programmable controller 95 which is not shown in FIG. 2 but will be discussed in connection with discussing other FIGURES.

In the FIG. 2 arrangement, which is adapted for being controlled by the new method and device that varies control parameters by modulating hot gas refrigerant flow with a throttling valve, there is a refrigerant evaporator 54 through which all entering outside air must pass. There is only a single passageway through the unit 40 and this passageway has a first refrigerant condenser or air reheat condenser 55 interposed in it. An auxiliary heater 56, which may use a burner, electric heating element, hot water or steam as a heat source, is shown but it is not necessary where the unit is installed in a climate wherein temperatures do not fall so low as to create a greater demand for heat than is available from reheater condenser 55. Note that in the FIG. 2 arrangement, only one damper 57 and one damper driving motor 58 is required as compared with the three-dampers and three damper motors used in the prior system. Damper 57, as was the case with damper 22 in the preceding FIGURE, is operated to an open state when the building is occupied and is closed when the building is unoccupied or, in some cases, it is closed during the nighttime. It will be evident, that the housing for the unit in FIG. 2 can be smaller and more simplified than the housing in the design of the pre-existing unit depicted in FIG. 1. Also note that two of the dampers that are indispensable in the prior FIG. 1 design are eliminated at a substantial saving in the FIG. 2 embodiment.

Where either of the units shown in FIGS. 1 or 2 is installed, it is necessary to have an exhaust blower, not shown, in the room or building to exhaust as many cubic feet of air per minute as are admitted by the unit. The circuitry for causing the exhaust blower to turn on whenever the blower motor 47 in unit 40 turns on can be devised easily so it is not shown.

Figure 3:
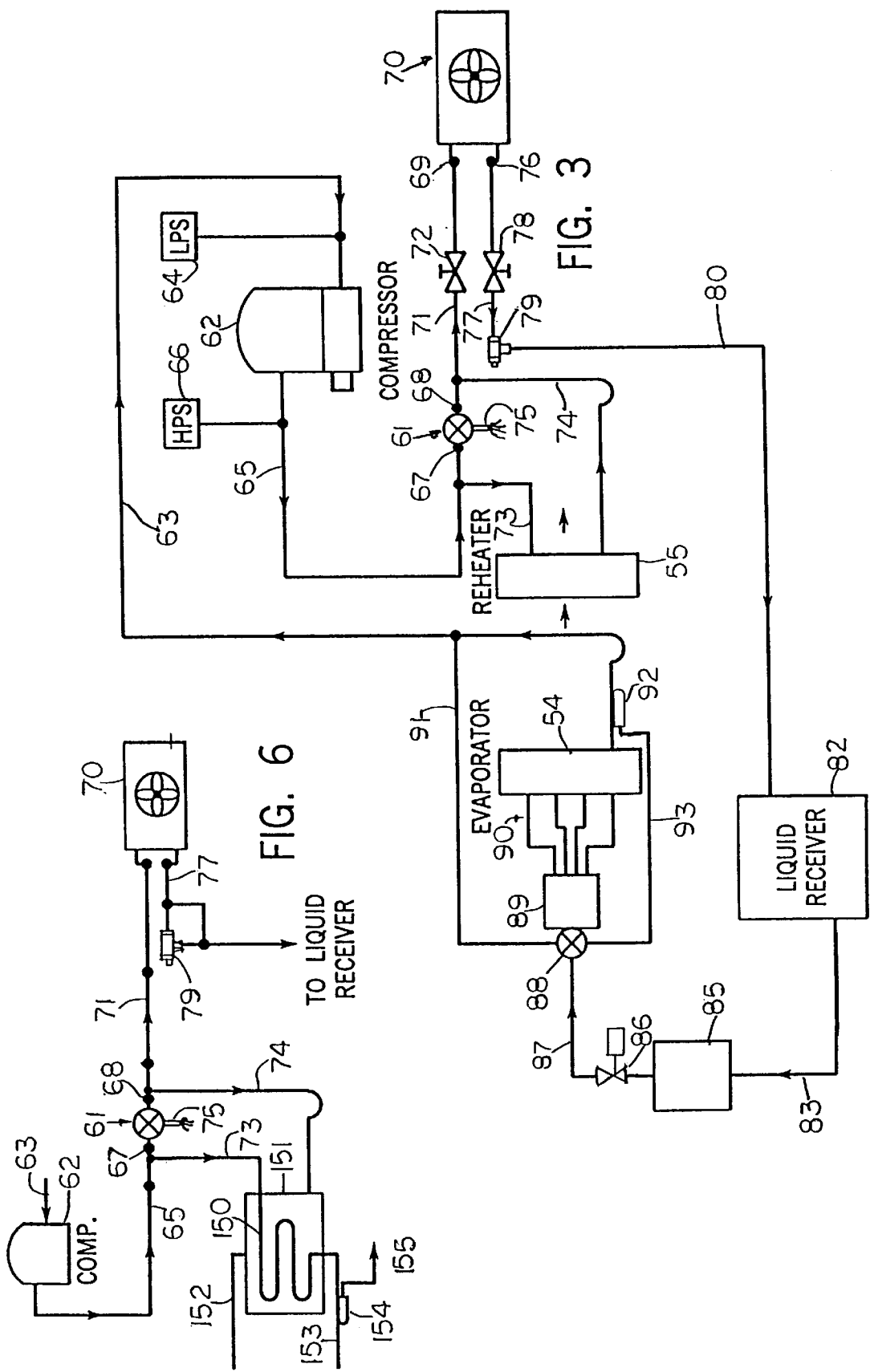
FIG. 3 is a diagram of the refrigeration system in which the new leaving air control system is incorporated.

The principal components of a refrigeration system for an outdoor air supply unit utilizing refrigerant flow control, according to the invention, rather than damper control according to prior practice, are depicted diagrammatically in FIG. 3. In this FIGURE, the evaporator and the reheat condenser are given the same reference numerals 54 and 55, respectively, that they were given in the FIG. 2 diagram. The new feature in the FIG. 3 refrigeration system is maintaining precise control of the leaving air temperature by utilizing an electronic throttling valve 61 for variously directing hot refrigerant gas flow proportionally into alternate flow paths. The refrigeration system is conventional to some extent in that it comprises a motor-driven compressor 62 that has the usual suction line 63 which conducts the refrigerant in a gaseous state to compressor 62. A sensor that responds, by turning off the compressor motor, in response to the refrigerant gas pressure dropping in suction line 63 to a level that is lower than an acceptable level is indicated by the symbol LPS and reference numeral 64. The pressurized hot refrigerant gas is conducted from the compressor by way of a discharge line 65 whose pressure is sensed by a sensor labeled HPS and also given the reference numeral 66. If the pressure in the discharge line 65 goes too high the sensor marked HPS will effect shutting down compressor 62. The hot gas discharge line 65 from the compressor connects to the inlet 67 of electronically controlled throttling valve 61 and to the inlet pipe 73 for reheat first condenser 55. The outlet 68 of throttling valve 61 is coupled to the inlet 69 of a second condenser 70 by way of a line 71 that contains a manually-operable valve 72. Second condenser 70 is not in the air stream flowing through housing 40 and may be positioned outside of the building. Reheater inlet line 73 and reheater outlet line 74 connect reheat condenser 55 in parallel, that is, in shunt with electroresponsive throttling valve 61. The throttling valve is symbolized as being under the control of electric signals and operating power provided by four conductors which are indicated by the numeral 75. Two of the conductors are at logical signal level of the other conductors apply electric power to the throttling valve for operating the valve. The opening of throttling valve 61 is in proportion to the magnitude of the control signal applied to the valve. A low level control signal fully closes the throttling valve 61 and as the signal increases the valve opening increases. When the throttling valve 61 is fully closed, all of the hot refrigerant gas is caused to flow through the reheat first condenser 55 and out in a path including lines 73 and 74. In such case, all of the pressurized hot refrigerant would be delivered to the inlet 69 of the second or outdoor condenser 70 after some heat has been removed from the refrigerant by the first condenser 55 which is the reheat condenser. If the valve is fully opened, substantially all of the hot refrigerant gas goes to inlet 69 of second condenser 70 and first condenser 55 is bypassed. In this arrangement, if air must be reheated after it is dehumidified and cooled excessively by passing over evaporator 54, then valve 61 is throttled in such manner that some, if not all, of the hot gas will pass through the coil of reheater condenser 55 to raise the temperature of the air that is compelled to pass over the reheater condenser 55. If the entering outdoor air is much warmer than the desired temperature for the leaving air, the compressor 62 is turned on automatically and the air passing through the evaporator 54 will be cooled and dehumidified if the air is above the dew point. Such air, of course, can pass over the first condenser coil 55 but since the programmable controller will have determined that reheating the air is not necessary when the entering air temperature is higher than the set point or desired leaving air temperature, it adjusts throttling valve 61 to a fully opened state so that none of the hot gas will pass through the coil of reheat condenser 55 but will, instead, be conducted to the remote or second condenser coil 70 for dissipating the excess heat into the outdoor atmosphere or other heat absorber outside of the main air stream through the housing 40.

Either vapor or a mixture of vapor and liquid refrigerant enters the heat dissipating second condenser 70 through inlet 69 but only liquid refrigerant leaves through outlet 76. The liquid refrigerant passes through the outlet 76 of the coil of remote outside second condenser 70 and by way of a line 77 containing a manually-operable valve 78, passes through a so-called flooding valve 79. Flooding valves 79 are routinely used to protect refrigeration systems from low high side pressures which occur when condenser loads fall excessively below design conditions e.g. low air temperatures at an air cooled condenser or low water temperatures in a water condenser. Typical flooding valves are factory set to maintain a minimum design high side pressure. These valves create a false load by simply creating a restriction in the liquid line 77. If the condenser load is sufficient to maintain necessary, heat pressure, the flooding valve opens fully and remains inactive.

During normal operation the flooding valve 79 is open and liquid refrigerant condensed in reheat condenser 55 and/or remote excess heat dissipating condenser 70 is conducted by way of a line 80 to a liquid refrigerant receiver 82. Assuming that the compressor is running and/or cooling and dehumidification of the entering air is required, the liquid refrigerant will be conducted from receiver 82 through a line 83 to the inlet of a dryer 85. A liquid line solenoid valve 86 opens when the compressor 62 is turned on to allow liquid refrigerant to flow through line 87 and then to a refrigerant expansion valve 88. The expansion valve 88 feeds a mixture of vaporized and liquid refrigerant into a distributor box 89 from which the refrigerant is fed through a plurality of feeder tubes 90 to parallel refrigerant conducting coils, not visible, in evaporator 54. Since the heat for liquid refrigerant vaporization is acquired from the air passing through the evaporator 54, the refrigerant stays in a low-pressure vapor state which is fed back to the compressor by way of suction line 63. Expansion valve 78 is controlled by the pressure in suction line 63 and the temperature of the gas in the suction line. Pressure in the suction line is sensed by expansion valve 88 through a tube 91. The temperature of the refrigerant gas in suction line 63 is sensed by a sensor 92 which connects by way of a tube 93 to the expansion valve 88.

Figure 4:
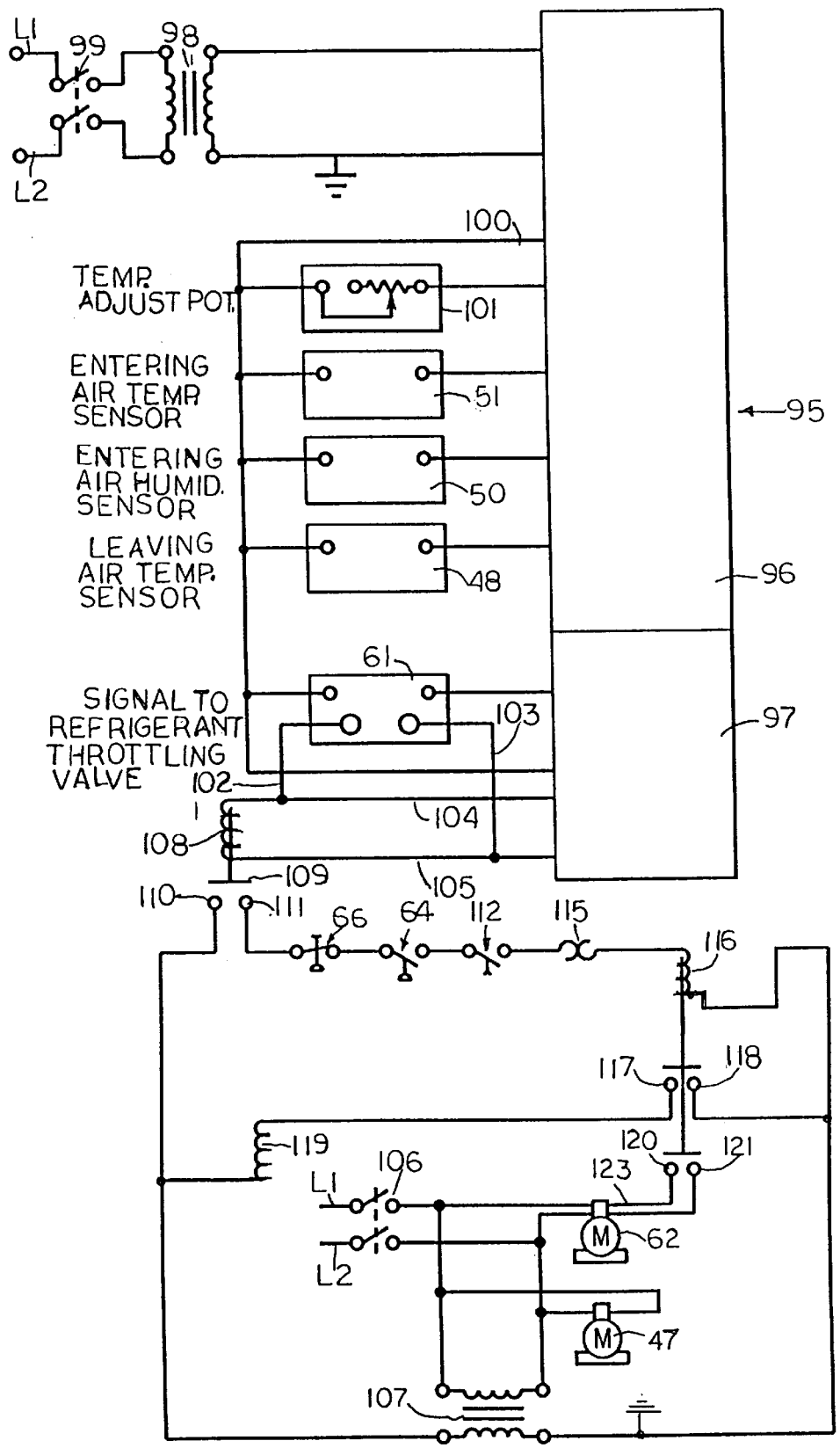
FIG. 4 is a diagram of the electrical circuitry involved in controlling the outside air admitting unit.

Attention is now invited to FIG. 4 for a discussion of the basic electrical circuitry that is involved in controlling the throttle valve 61 for the leaving air temperature to be held precisely at a set value. A previously mentioned microprocessor based programmable controller is symbolized by the rectangle that is marked with the numeral 95. It has a power input and a signal input section 96 and a signal output section 97. Near the top of the rectangle 95 one may see that the controller is supplied with power which may be 24 V.A.C. or other suitable voltage from an electric power source such as the secondary winding of a transformer 98 whose primary winding is supplied from the electrical system of a building through a two-pole line switch 99 from building lines L1 and L2. A common line 100 provides a suitable voltage to the previously mentioned leaving air temperature air sensor 48, the entering air humidity sensor 50 and the entering air temperature sensor 51.

Also provided is a not previously mentioned temperature adjust potentiometer 101. This potentiometer provides the user with an opportunity to set or choose the temperature at which the leaving air will be controlled. The output lines that connect the sensors 48, 50, 51 and potentiometer 101 to the programmable controller will be inputting signals to the controller in accordance with how the input voltage signal that is provided to the various sensors and potentiometer is modulated by the sensors or potentiometer adjustment. The controller 95 is programmed for utilizing the entering air temperature and humidity information or, in some cases only the entering air temperature, to calculate the value of a signal that should be output to the throttling valve 61 for it to regulate the flow of hot high-pressure refrigerant gas at such level as to maintain the leaving air temperature at the constant selected level with great precision. As mentioned previously, the system could also work if a characteristic of the entering air such as only the dry bulb temperature or only the humidity or only the dew point temperature is sensed and converted to a signal that is an input to the controller.

In FIG. 4, the electronic throttling valve 61 is represented by a rectangle marked similarly. The conductors of the operating electric power for the electronic throttling valve 61 are marked 102 and 103. The operating voltage is derived from lines 104 and 105. When the building is occupied, double-pole switch 106 in the FIG. 4 diagram can be manually closed to make power at the building electrical system voltage available from lines L1 and L2. When switch 106 is closed, blower motor 47 turns on. When the primary winding of transformer 107 becomes energized, voltage becomes available on its secondary output terminals. The compressor motor 62 starts when it is ordered to start by the programmable controller 95. It is ordered to start when the entering air temperature and humidity signals sent to controller 95 from sensors 50 and 51 in the illustrative embodiment are at such high values, corresponding to a high dew point, that cooling and dehumidifying and possibly reheating of the entering air are required as a result of the controller computing that this is necessary to meet the leaving air temperature set point. Starting is initiated by supplying a voltage over lines 104 and 105 to energize a solenoid coil 108 which controls a contact 109. When the contact closes the gap across terminals 110 and 111, a series of events takes place. Safety requirements may be satisfied in various ways other than the following ways adopted herein that are known to those skilled in the art. In this illustrative embodiment of the invention, a time delay switch contact 112 closes as does a contact 113 that is controlled by low-pressure sensor 64. Contact 114, controlled by the high-pressure sensor 66, is normally closed and will only open if pressure in the high pressure line 65 from the compressor exceeds a certain level. The contacts 115 of a thermal overload device are normally closed and do not open unless the motor of compressor 62 draws excessive current. In any case, when the programmable controller 95 computes that the compressor 62 of the refrigeration system should turn on, the solenoid 108 controlling contact 109 operates to complete the circuit such that the solenoid coil 116 becomes energized. This closes the gap between contacts 117 and 118 such that the solenoid 119 that controls the liquid line valve 86 opens and permits flow of refrigerant to expansion valve 88 and to the evaporator 54. Solenoid 116, when energized, also closes the gap between a pair of terminals 120 and 121 which are in a switching loop 123 that connects the compressor 62 across lines L1 and L2. Note that the refrigeration compressor is running and the electronic throttling valve 61 is receiving a control signal from programmable controller 95 which dictates the extent to which the throttling valve is opened to bring about proportioning of the high-pressure hot gas from the compressor between the reheater condenser 55 and the remote condenser 70.

To summarize: (1) If the temperature of the entering air is below the desired set temperature for the leaving air, the controller 95 will not turn on the refrigeration compressor 62. Under this circumstance the throttling valve 67 is completely inactive since it is not proportioning hot refrigerant gas nor is it receiving a control signal from controller 95. If there is an auxiliary heater 56 in the unit 40, it can be turned on by a suitably programmed controller when the entering outside air is too cold for the comfort of the occupants. When the entering outside air is indicated by sensor 50 to be at a temperature that is higher than the set temperature for the leaving air, the programmable controller 95 recognizes this condition and turns on the refrigerant compressor 62 and also factors in the signal value sent to the controller from humidity sensor 51. With the compressor 62 operating and the refrigeration system shown in FIG. 3 activated, the entering air that passes over the coils in the evaporator 54 is cooled and dehumidified. At this time the programmable controller 95 is sending a signal for modulating throttling valve 61. The signal will always be at an instantaneous adjusted level and may be varying in accordance with the real time computation of the signal by the controller depending on the entering air temperature and humidity and on the instantaneous temperature of the leaving air whose temperature sensor 48 provides a feedback signal. The system functions such that the leaving air is held precisely at a selected temperature and has a dew point that is no higher than would be acceptable. These conditions are achieved, when refrigeration is called for, exclusively by modulating the throttling valve 61 in a closed loop system. In this example it has been assumed that the entering air is cooled sufficiently to condense the humidity so reheating the air with reheat condenser 55 is necessary. The programmable controller 95 determines how much reheating is required to maintain the set leaving air temperature and adjusts the throttling valve 61 accordingly. If much reheating is called for, throttling valve 61 is regulated to permit less flow through it and thereby divert more of the hot refrigerant gas delivered by pipe 65 through the tubes of reheat first condenser 55 and the remainder of the refrigerant is directed to the second condenser 70 for dissipating the excess heat to the atmosphere or a heat utilization system. All of the liquid refrigerant that is condensed in the reheat first condenser 55 together with that which is condensed in the second condenser 70 is deliverable to expansion valve 88 for evaporator 54. However, it should be observed that the temperature of the leaving air from the reheat condenser that is delivered to the room ultimately depends on the instantaneous adjustment of the throttling valve 61.

The concept, as in FIGS. 2–5, of controlling the temperature of an air stream by having a reheat condenser connected as a shunt across an electroresponsive refrigerant flow throttling valve can also be used to control water temperature as demonstrated in FIG. 6. Items in this FIGURE that correspond to items in FIG. 3 are given the same reference numerals. In this case, when the compressor 62 runs, a mixture of pressurized hot refrigerant vapor and liquid is fed to inlet 67 of throttling valve 61 whose outlet 68 is coupled to the inlet 69 of heat dissipating condenser 70. A refrigerant condenser coil 150 in a water tank 151 is connected as a shunt around valve 61 by means of pipes 73 and 74. Water flows into the tank from line 152 and, after being in heat exchange contact with condenser coil 150, flows from the tank by way of line 153. A temperature sensor 154 contacts the hot water pipe 153 and sends a signal by way of wire 155 corresponding to water temperature to controller the input section of a controller such as controller 95. The controller outputs a signal to throttling valve 61 by way of two of the conductors in cable 75. When the hot water temperature tends to change to above or below the desired set point temperature for the heated water, the signal to the valve causes it to open more or close more, respectively, to correct the output water temperature instantaneously. The desired temperature of the heated water can be set with a manually adjustable potentiometer such as potentiometer 101 in FIG. 4.

Incidentally, in describing the embodiment of FIGS. 2 and 3 which is concerned with conditioning entering air, control is based on having sensed the dry bulb temperature and humidity of the entering air and the dry bulb temperature of the leaving air. Those who are skilled in the art to which the invention pertains will recognize that it would be possible to not sense any characteristic of the entering medium when the medium is outside air but to use only the temperature of the leaving air as the signal that is utilized by a suitably programmed controller to develop the modulating signal for the throttling valve.

Figure 5:
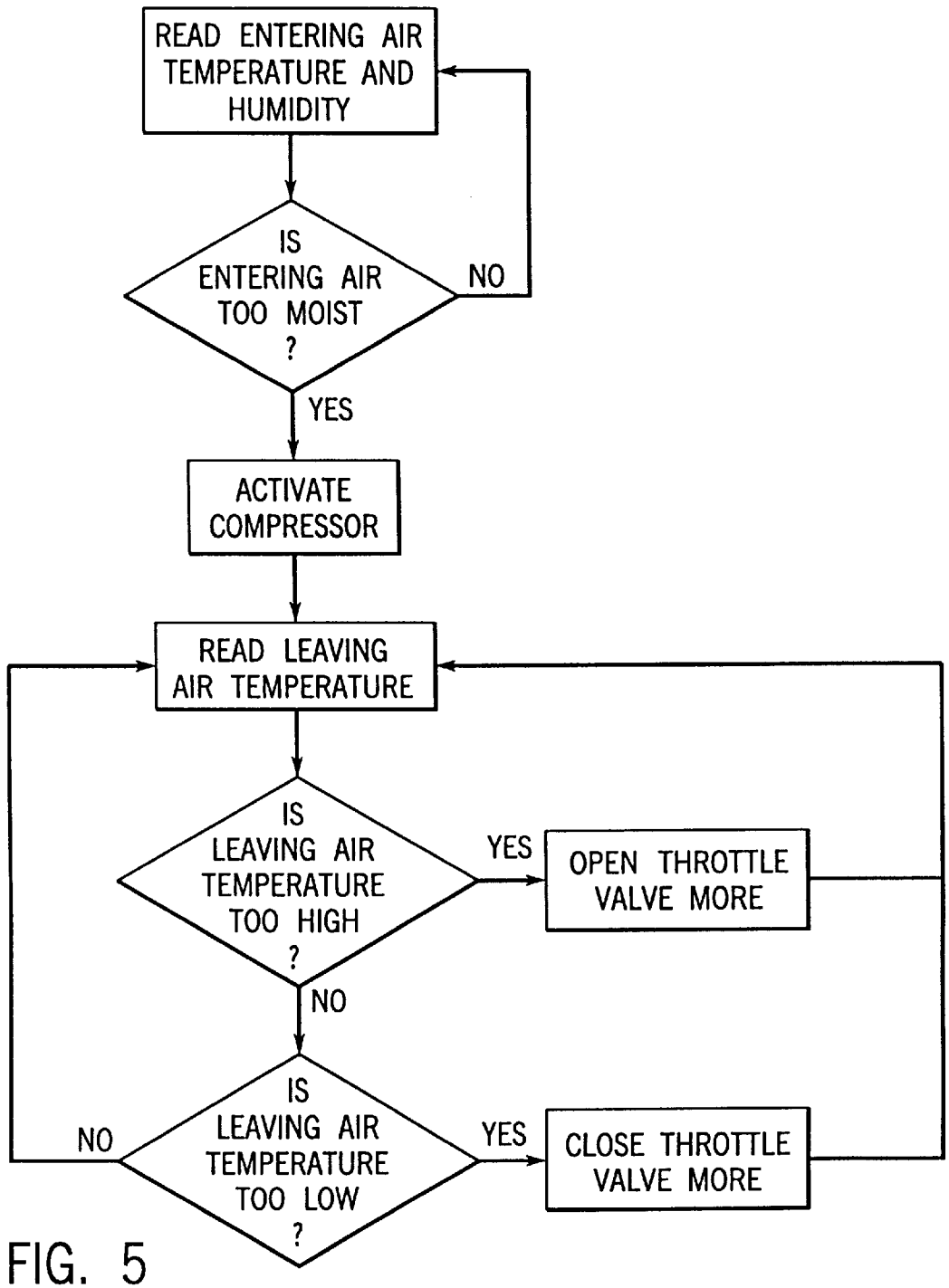
FIG. 5 is a flow diagram of the logic involved in controlling the unit.

The logic underlying control of electroresponsive refrigerant flow-throttling valve 61 is set forth in the FIG. 5 flow diagram. The diagram is described with its own legends and requires no further explanation to those who are skilled in the art.

A suitable throttling valve 61 is obtainable from the Sporlan Valve Company of Washington, Miss.

We claim:

1. A system including:

a refrigerant compressor having a suction inlet and a compressed refrigerant outlet, a housing, a first condenser comprising a reheat condenser located in said housing and a second condenser isolated from a main air stream flowing through said housing, each of said condensers having an inlet and an outlet for refrigerant, said first condenser inlet being coupled to said compressed refrigerant outlet, an electro responsive refrigerant flow-throttling valve having an inlet coupled to said outlet of the compressor and said valve having an outlet coupled to said inlet of the second condenser, said valve being controllable to increase and decrease the flow of refrigerant there through in accordance with the level of an electric signal applied to the valve, and a fluid flow conduit in parallel with said valve coupling the outlet of said first condenser with the inlet of said second condenser an evaporator having an inlet and an outlet for refrigerant and an expansion valve coupled to said inlet of the evaporator, said outlet of said second condenser being coupled to said expansion valve and said outlet of the evaporator being coupled to said suction inlet of the compressor, a motor driven blower positioned for drawing entering air through said evaporator and through said first condenser in the stated order for said blower to exhaust said air as leaving air, a programmable controller having signal input and output means with an output means coupled to said flow-throttling valve for controlling said valve, a temperature sensor for sensing the temperature of said leaving air and providing a signal to said controller representative of the leaving air temperature, sensor means positioned in the entering air stream for sensing at least one characteristic of a plurality of characteristics that define the condition of said entering air before the air passes over said evaporator wherein when a plurality of characteristics are sensed the dry bulb temperature is among the characteristics said sensor means producing a signal representative of a sensed characteristic, said signal being coupled to said input means of said controller, said controller utilizing one or more of said signals to determine if said evaporator should be activated to cool the airstream, and if the need for cooling is determined, said controller outputs a signal that causes said compressor to operate and outputs a signal for controlling said throttling valve to apportion the refrigerant discharged from said outlet of said compressor between said first condenser and said second condenser to thereby hold said leaving air at a selected temperature.

2. A system according to claim 1 including a sensor that is operative to sense the humidity characteristic of said entering air and to produce a signal representative of the humidity and said signal is coupled to said input means of said programmable controller.

3. A system according to claim 1 including a sensor that is operative to sense the dew point temperature characteristic of said entering air and to produce a signal representative of the dew point temperature and said signal is coupled to said input means of said programmable controller.

4. An air conditioning system comprising:

a housing having an inlet for entering air and an outlet for leaving air, a refrigerant evaporator having an inlet and outlet for refrigerant and a first reheat condenser having an inlet and an outlet for refrigerant, said evaporator and reheat condenser being arranged in the stated order in said housing, between said inlet for entering air and outlet for leaving air, respectively, a second condenser positioned outside of said airstream and having an inlet and an outlet for refrigerant, a motor driven blower arranged for drawing an airstream in said housing through said entering air inlet, said evaporator, and said reheat condenser in the stated order for said blower to discharge said airstream as leaving air from the housing, a refrigerant compressor having a suction inlet and a compressed refrigerant outlet, an electroresponsive refrigerant flow-throttling valve having an inlet coupled to said outlet of the compressor and to said inlet of said first condenser, and said valve having an outlet coupled to the outlet of said first condenser and to said inlet of said second condenser, said valve being controllable to increase and decrease the flow of refrigerant therethrough in correspondence with the level of an electric control signal for to the valve, an expansion valve having an outlet coupled to said inlet of the evaporator and having an inlet and means for coupling said outlet of said second condenser to said inlet of the expansion valve, a programmable controller having signal input and output means with an output means coupled to said flow-throttling valve, a temperature sensor positioned for sensing the temperature of said leaving air and providing an input signal to said controller representative of said temperature, a temperature sensor and a humidity sensor adapted for sensing the temperature and humidity of said entering air and to produce signals representative of said temperature and humidity, respectively, said signals being coupled to said input means of said controller, said controller utilizing said entering air temperature and humidity representative signals to determine if said compressor should be started for supplying refrigerant to said evaporator activated to cool the airstream and if the need for cooling the entering air is determined said controller outputs a signal that causes said compressor to operate and also outputs said electric signal for controlling said throttling valve to apportion the refrigerant discharged from said outlet of the compressor between said reheat condenser and said second condenser for maintaining said leaving air at a selected temperature.

* * * * *